(No Model.) 2 Sheets—Sheet 1.

J. T. WILSON.
DIE FOR MAKING DRAW BARS.

No. 381,894. Patented Apr. 24, 1888.

Witnesses. Inventor.
Jno. H. Scott. John T. Wilson
Wm. E. Dyre. By his Attorneys
Johnston, Reinohl & Dyre.

(No Model.) 2 Sheets—Sheet 2.
J. T. WILSON.
DIE FOR MAKING DRAW BARS.
No. 381,894. Patented Apr. 24, 1888.
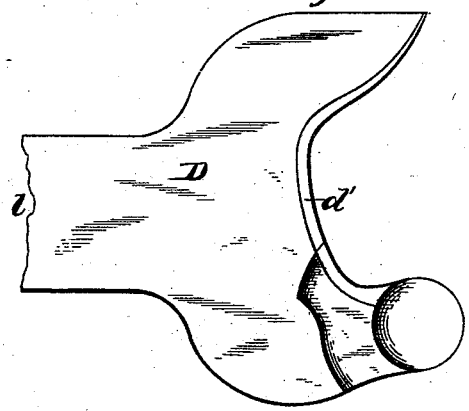
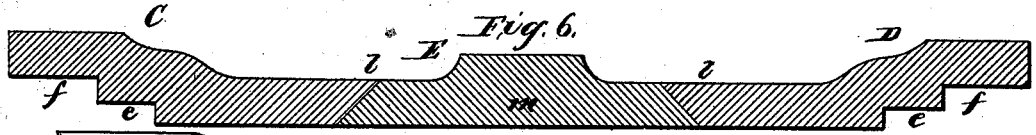
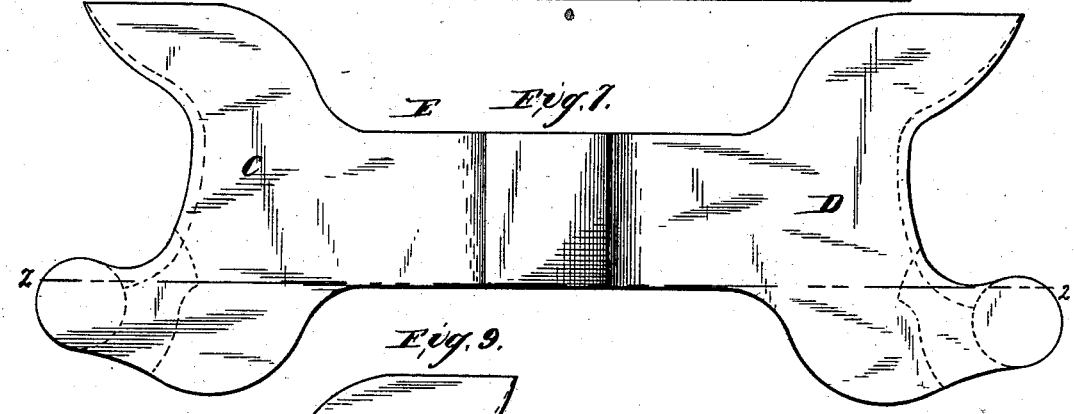
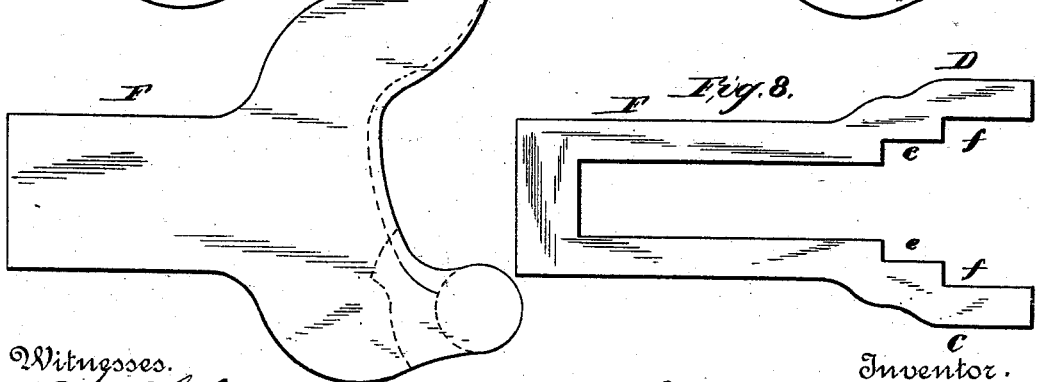
Witnesses. Inventor.
Wm H Scott John T Wilson
Wm E Dyre By his Attorneys
Johnston, Reindhl & Dyre.
N. PETERS, Photo-Lithographer, Washington, D. C.

United States Patent Office.

JOHN T. WILSON, OF PITTSBURG, PENNSYLVANIA, ASSIGNOR OF ONE-HALF TO THE PITTSBURGH FORGE AND IRON COMPANY, OF SAME PLACE.

DIE FOR MAKING DRAW-BARS.

SPECIFICATION forming part of Letters Patent No. 381,894, dated April 24, 1888.

Application filed January 18, 1888. Serial No. 261,086. (No model.)

*To all whom it may concern:*

Be it known that I, JOHN T. WILSON, a citizen of the United States, residing at Pittsburg, in the county of Allegheny and State of Pennsylvania, have invented certain new and useful Improvements in the Manufacture of Draw-Bars; and I do hereby declare the following to be a full, clear, and exact description of the invention, such as will enable others skilled in the art to which it appertains to make and use the same.

My invention relates to the manufacture of draw-bars, and has special reference to draw-bars used in connection with the "Janney" coupler and similar constructions. The draw-bars now used with this class of couplers are made of cast malleable iron or steel, and are in consequence thereof very heavy. It is my purpose to construct them of wrought metal, and thereby reduce their weight and increase their durability. The great barrier hitherto found to exist in the way of making said draw-bars of wrought metal has been the difficulty of forming the peculiarly-shaped heads. I have discovered that the head can be formed separately by forging it in a right-and-left section or member and then welding them to an intermediate body portion, and thus form a light and durable draw-bar.

The invention will be hereinafter described, and particularly pointed out in the claim.

Figure 1:
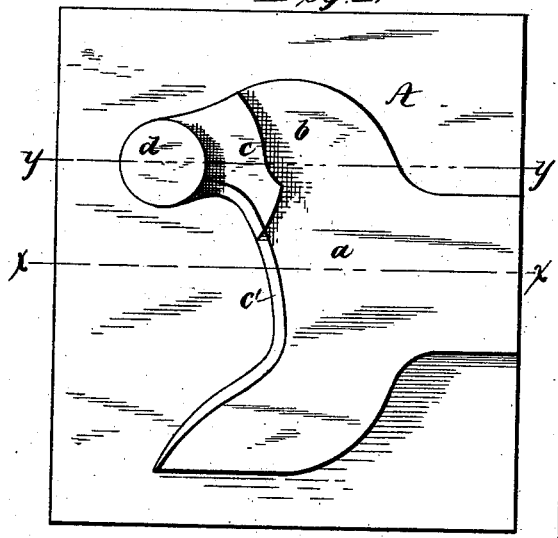
Figure 2:
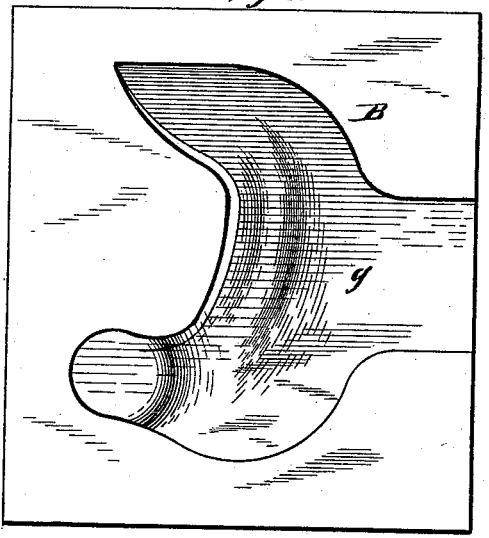
Figure 3:
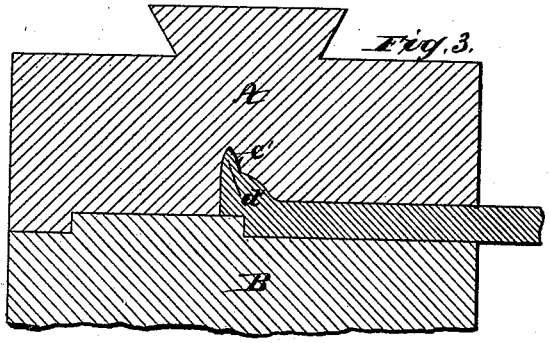
Figure 4:
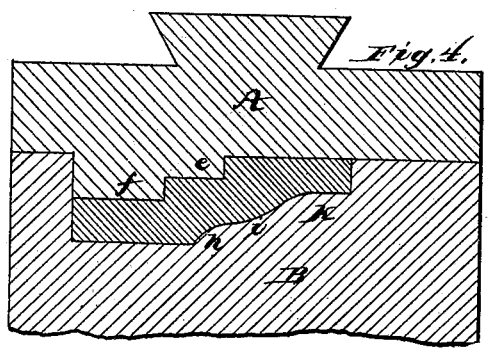

In the accompanying drawings, which form a part of this specification, Figure 1 represents a plan of the male die; Fig. 2, a similar view of the female die. Fig. 3 is a vertical section on the line $x\ x$; Fig. 4, a similar view on the line $y\ y$. Fig. 5 is a plan of one of the sections for forming the head of the draw-bar. Fig. 6 is a longitudinal section of a draw-bar blank on the line $z\ z$ of Fig. 7. Fig. 7 is a plan of a blank prior to bending. Fig. 8 is a side view of a draw-bar, and Fig. 9 is a plan view thereof.

Reference being had to the drawings and the letters marked thereon, A indicates the male die, and B the female die. The male die is provided with a main projection or head, $a$, which corresponds in configuration with the head of a Janney or other similar coupler, and on the arm $b$ are additional projections $c\ d$, which form the rabbets $e\ f$ on the inside of the end sections, C D, which constitute the ends of the draw-bar blank E (shown in Fig. 7) and form the upper and lower sides of the completed draw-bar F. (Shown in Figs. 8 and 9.) The rabbets $e$ and $f$ are formed to receive the vertical coupler-hook (not shown) used in this style of draw-bars. The male die is also provided with a groove, $i$, which forms the head $d'$ on the sections.

In constructing the sections C D the metal is worked so that a continuous fiber of the metal is presented in the head. The female die B is provided with a recess, $g$, which corresponds with the main projection or head $a$ on the male die, and is curved at the points $h\ i\ k$ on the line $z\ z$ to give finish to the outer surface of the draw-bar head.

The dies are made in pairs, one right and the other left, to form the sections C D. After the sections have been drop-forged the end $l$ is chamfered, and two sections, one right and the other left, are welded to a body section, $m$, to form the blank E. (Shown in Figs. 6 and 7.) The blank is then heated in the center and bent into the form shown in Figs. 8 and 9, and constitutes a completed draw-bar. The body portion $m$ may be bent before the end sections are welded thereto, if desired.

The method involved in the manufacture of draw-bars, as herein described, forms the subject-matter of another application for Letters Patent, Serial No. 268,414, filed as a division of this application.

Having thus fully described my invention, what I claim is—

The die herein described for manufacturing vertical-hook draw-bar heads, which consists of a male die having a head of substantially the configuration shown, and provided with the projections $c\ d$, in combination with a female die having a recess corresponding with the head of the male die, substantially as described.

In testimony whereof I affix my signature in presence of two witnesses.

JOHN T. WILSON.

Witnesses:
F. E. RICHARDSON,
F. J. ALBERTE.